United States Patent
Gamble (10) Patent No.: US 10,153,627 B1
(45) Date of Patent: Dec. 11, 2018

(54) FLOOR CABLE COVER FOR HEAVY-USE ENVIRONMENTS

(71) Applicant: Thomas Gamble, Duluth, GA (US)

(72) Inventor: Thomas Gamble, Duluth, GA (US)

( * ) Notice: Subject to any disclaimer, the term of this patent is extended or adjusted under 35 U.S.C. 154(b) by 0 days.

(21) Appl. No.: 15/854,160

(22) Filed: Dec. 26, 2017

Related U.S. Application Data (60) Provisional application No. 62/438,979, filed on Dec. 23, 2016.

(51) Int. Cl.
*H02G 3/04* (2006.01)

(52) U.S. Cl.
CPC ............ *H02G 3/0418* (2013.01); *H02G 3/045* (2013.01)

(58) Field of Classification Search
CPC .............................. H02G 3/0418; H02G 3/045
USPC ..................................... 174/97, 101; 248/74.2
See application file for complete search history.

(56) References Cited

U.S. PATENT DOCUMENTS

| | | | | |
|---|---|---|---|---|
| 3,459,875 A | * | 8/1969 | Fork | H02G 3/283 138/115 |
| 7,145,079 B1 | * | 12/2006 | Henry | H02G 3/0418 174/101 |
| 7,810,197 B1 | * | 10/2010 | Anthony | F16L 3/2235 14/69.5 |
| 7,943,851 B2 | * | 5/2011 | Lubanski | F16L 57/00 138/155 |

* cited by examiner

*Primary Examiner* — Dhirubhai R Patel
(74) *Attorney, Agent, or Firm* — F. Russell Denton, Esq.; Denton Intellectual Property Law Firm, LLC (57) ABSTRACT

The invention provides a bottomless cable cover for power and communications cables. The cable cover is characterized in part by a traffic portion and asymmetrically disposed support rails. The materials, dimensions, and aspect ratios enable faster, more adaptable, and larger-scale protection of power and communications cables that are laid on floors, without impeding hard or heavy traffic. Cable covers according to the present invention also enable decorative use.

19 Claims, 6 Drawing Sheets

FLOOR CABLE COVER FOR HEAVY-USE ENVIRONMENTS

CROSS-REFERENCE TO RELATED APPLICATION

This application claims priority from U.S. Provisional Application No. 62/438,979 filed Dec. 23, 2016 by the present inventor and entitled "Improved Threshold Raceway for Power and Communications Cables".

STATEMENT REGARDING FEDERAL FUNDS

No federal funds were used in the research or development of this invention.

FIELD OF THE INVENTION

This invention relates to protective covers for power and communications cables that are located on floors in high-traffic environments.

BACKGROUND OF THE INVENTION

The feeding of power and communication cables across floors has long presented a problem in high-traffic environments such as production areas, warehouses, retail spaces and office complexes. Commercially available floor raceways are unable to accommodate the number and or bundled diameters of the cables that need to be run along a particular path. Moreover electrical codes forbid cramming when cables are routed through a tightly confined space such as a raceway. Also, in many cases the raceway designs are too boxy or protruberant and in most case they are insufficiently rugged to withstand the weight of heavy traffic over a sustained period of time. This is especially a problem in aisles, at the threshold of doorways, and in large open areas where the cables cross a substantial distance from a wall or floor power supply to power receptacles and or communication jacks at remote positions.

Apart from locations that are coextensive with a wall, positioning a power cable along a floor is further unacceptable due to tripping hazards for foot traffic. Also, power cables are often encased in flexible metal conduit, which is unsightly and impedes movement of equipment across the floor. Communication cables are more delicate than power cords, thus they present additional concerns, such as ready damage if stepped on, run over, slid over or tripped over. Thus communication cables are often encased in a protective conduit, and that results in the same problems as for power cords.

The usual way to overcome these difficulties is to feed the cables overhead, such as in the proximity of rafters or above drop ceilings, and then to feed such cables downward at many locations in association with power poles. Such feeding increases the complexity and often requires many power poles, which may be unsightly and in any case are undesirable obstacles on the working floor area. Alternatively, cables are fed under a raised floor, which is itself a tedious task. The need to use upward or downward detours of cables to circumvent traffic on working floors not only adds to the time, cost and tedium of electrical installations, but also hinders reconfiguring the cable network when distribution needs for power and data change over time at that site.

Thus there is an ongoing need for improved design of cable protectors that can accommodate high traffic while still enabling cable distribution across a floor. It is an object of this invention to provide such protectors for the feeding of power and communication cables.

SUMMARY OF THE INVENTION

The invention provides a bottomless cable cover for power and communications cables, and is characterized in part by a traffic portion and asymmetrically disposed support rails. The materials, dimensions, and aspect ratios enable faster, more adaptable, and larger-scale protection of power and communications cables that are laid on floors, without impeding hard or heavy traffic. Cable covers according to the present invention also enable decorative use.

In a particular embodiment the invention provides a heavy-duty cable cover for power and communication cables located on floors, comprising:

a) a traffic portion formed from a single sheet of sheet material having uniform thickness, wherein the traffic portion has a longitudinal axis and a latitudinal axis that define its length and width respectively, and wherein the traffic portion comprises:

i) a central zone that extends along the entire length of the traffic portion and is characterized in that:
  A) when the cable cover is in a position for use on a floor the central zone is horizontal and flat;
  B) the central zone has a leftward boundary and a rightward boundary;
  C) the central zone defines a first series of orifices that is near to but to the right of the leftward boundary of the zone;
  D) the central zone defines a second series of orifices that is near to but to the left of the rightward boundary of the zone; and
  E) the central zone has a length:width aspect ratio of no more than 4.5:1;

ii) a leftward zone that is adjacent to the central zone's leftward boundary and is characterized in that:
  A) the leftward zone has a material-wise width that is at least 30 percent as large as the width of the central zone;
  B) when the cable cover is oriented as for use on a floor the leftward zone is angled downward from a horizontal plane defined by the central zone; and
  C) the leftward zone has a right boundary that is defined by a bend in the sheet material of the traffic portion;

iii) a rightward zone that is adjacent to and bounds the central zone's rightward boundary and is characterized in that:
  A) the rightward zone has a material-wise width that is at least 30 percent as large as the width of the horizontal portion;
  B) when the cable cover is oriented as for use on a floor the rightward zone is angled downward from a horizontal plane defined by the central zone; and
  C) the rightward zone has a left boundary that is defined by a bend in the sheet material of the traffic portion; and b) a plurality of support portions formed from a sheet material and characterized in that:

i) when the cable cover is oriented for use on a floor each support portion is a rail that runs in the direction of the longitudinal axis of the traffic portion:
  ii) each rail has a length:height aspect ratio that is at least 57:1;
  iii) each rail is affixed to the traffic portion at its underside and the cable cover comprises five such rails disposed in parallel:

A) a first rail is disposed parallel to and leftward of the first series of orifices;
B) a second rail is disposed parallel to and rightward of the first series of orifices;
C) a third rail is disposed parallel to and leftward of the second series of orifices;
D) a fourth rail is disposed parallel to and rightward of the second series of orifices; and
E) a fifth rail is disposed parallel to and asymmetrically between the second and third rails, such that the distance between the second and fifth rails when compared the distance between the third and fifth rails is represented by a ratio that is greater than 3:2 or less than 2:3.

Other objects and purposes of the cable cover according to the present invention will be apparent upon reading the following specification and inspecting the accompanying drawings.

BRIEF DESCRIPTION OF THE DRAWINGS

Cable covers of the present invention may be further understood by reference to the Figures as described below. The Figures as provided here depict caricatures of a nonlimiting illustrative embodiment.

FIG. 4 is drawn at three times the scale of FIGS. 1, 2 and 3.

DETAILED DESCRIPTION

Definitions

The invention may be better understood by reference to the definitions below for the respective terms used herein.

"Cable" means an electrical cable. "Power cable" means a transmission line for a power source. "Communication(s) cable" means a cable through which information is conveyed by analog or digital signals.

"Cable cover" means a housing that protects the layout of one or more cables. This includes but is not limited to raceways. Raceways as defined in technical specifications are enclosed on all sides, whereas the present invention is bottomless. The "longitudinal axis" of cable covers of the invention is the direction along which the cable is oriented within the cover. Its "latitudinal axis" is the direction orthogonal to the longitudinal axis and parallel to the floor when the cable cover is in use on a floor. Axes that are deemed longitudinal and latitudinal for a cable cover are likewise imputed to the parts from which it is formed. The terms "in a position for use on a floor" and "oriented for use on a floor" are synonymous and mean that the cable cover is placed horizontally on the floor with support rails directed downward.

"Sheet material" means material in the form of sheets or plates. Nonlimiting illustrative examples of such materials include metals, polymers, ceramics, and glasses. Cable covers made of glasses or transparent or translucent polymers offer additional decorative options including see-through and or colorful cable covers. Nonlimiting illustrative polymers suitable for the invention include polycarbonates, polyesters, polyacrylates, rubbers, and composites such as filled polymers and the like. A particularly useful type of glass for the invention is so-called bulletproof glass.

"Metal" has its usual and ordinary meaning in the electrician's art, and includes alloys as well as pure metals. Illustrative nonlimiting examples include iron, steel, aluminum, copper, brass, bronze, tin, zinc, clad materials such as galvanized metal, and the like. The names for various metals as used here have their usual and ordinary meanings in materials science. The term "sheet" of metal means a thin flat plate of metal but is not limited by a particular thickness, the term "sheet" of metal encompasses metal plates as well. The term "thickness" as used with respect to a sheet of metal refers to the narrowest dimension. The term "uniform thickness" as used with respect to a sheet of metal means that it has at least the ordinary degree of sameness of thickness throughout with which such a sheet is provided by vendors. The term "single" as used with respect to a sheet of metal means that there is only one.

"Upper" and "lower" as used with respect to surfaces designate their orientation when the cable cover of the invention is in position for use. A "smooth" surface has no raised or indented features, such as a surface that is matte or polished. A "non-smooth" surface has raised or indented features, for which nonlimiting illustrative examples are ribbed contours, grainy topography, roughness from etching, checkerboard bas relief, waffle pattern, and raised cobblestone patterns, as those features are commonly known in the art of metal preparation.

"Bending" of a sheet material refers to a bend introduced by any means used in the art of fabricated components. "Formed by bending" a sheet means that its shape was achieved by such a step. In particular, malleable materials such as metals and polymers, as well as extruded materials, are useful for introducing bent shapes.

With respect to the invention "traffic portion" means the sheet of metal that constitutes the mesa-like top of the cable cover and over which foot traffic and equipment passes when the invention is in use. The "upper surface" of the traffic portion is the side over which equipment passes. The traffic portion has three zones, each of which runs its entire length: the central zone and neighboring it on opposite edges the "leftward" and "rightward" zone. To avoid confusion the selection as to which is designated "leftward" or "rightward" is determined by features below it: the rails having the least separation in the asymmetry are affixed to the leftward zone, as discussed below. Where the central zone is described as "horizontal" or "flat" those terms have their usual and ordinary dictionary meanings, however minor deviations introduced by fabrication or wear do not make the central zone un-horizontal or un-flat for purposes of the invention. The term "boundary" is used to demarcate between the central zone and leftward or rightward zones means where the sheet material has downward bends, thereby creating a twice-bent sheet whose corners and ends roughly define a shallow acute trapezoid when viewed from either end.

As used with respect to sheet materials, rightmost and leftmost "edges" means the extremities of the sheet and their edges, corners and vertices. A sheet material having an "edge . . . in contact with floor" means that the edge, its corners, and or its vertices is or are in contact with the floor. "Bevel" has its usual and ordinary meaning with respect to edges, but to be clear this may include a chamfer. "Rounded" with respect to an edge means that sharp corners and or vertices are removed and smoothed; the term rounded is used in its broadest sense to mean that the edge is curved, not that it necessarily conforms to an arc of a circle. The term "lowermost" with respect to an edge means the portion of the edge that is lowest when the cable cover is in a position for use.

"Orifice" with respect to a metal plate means a hole through which a bolt or other fastener may be passed. A "series" of orifices means a plurality of them. The term "near to" as used with respect to orifices and zone boundaries of the traffic portion means that the orifices are nearer to the referenced boundary than to a virtual center line along the length of the metal sheet. The terms "right of" and "left of" as used with respect to zone boundaries are consistent with the hand sense for definitions of rightward and leftward given above. An orifice "diameter" is measured horizontally across its narrowest distance. An orifice diameter "sufficiently wide to permit passage" of a bolt means that the bolt may be inserted through it; in certain embodiments this results in a snug fit between the bolt and orifice but the invention is not so limited.

"Aspect ratio" means the ratio of two dimensions in the order they are given.

A "material-wise" dimension means that the referenced dimension is taken along the upper surface of the material, not with respect to its corresponding length when viewed from above or below. E.g., for an angled zone formed by bending a metal sheet, the material-wise width when viewed end-on is approximately the hypotenuse, not the sine (height) or cosine (amount of floor space taken up) of that zone.

"Angled downward" as used with respect to the leftward and rightward zones mean that when the cable cover is in position for use on a floor, those zones extend simultaneously outward and toward the floor relative to a horizontal plane along which the central zone lies.

"Support portion" with respect to the invention cable cover is a part that is capable of transferring weight on the traffic portion to the floor.

"Rail" means a long thin support portion. In particular embodiments a rail is a thin strip that runs the length of the cable cover, with its width—as opposed to its thickness—supporting the traffic portion, but the invention is not so limited.

"Vibration-damping material" means a material that absorbs vibration and jarring. Such materials cut the noise from the interface of hard surfaces. Non-limiting illustrative materials include rubbers, plastics, viscous substances, fabric, synthetic and natural fibers, and the like. In particular embodiments vibration-damping material is disposed on the upper surface of the traffic portion, and or on the lower surface where the floor meets the traffic portion or one or more rails.

"Affixed" as used with respect to a support rail on the under-surface of a traffic portion means that the affixed rail is secured there. Non-limiting illustrative examples of such affixing include: extrusion as a monolithic shape; welds; adhesive such as superglue and the like; bolts; and screws; in the usual and ordinary sense of those terms. Particularly preferred embodiments are extrusion and welding but the invention is not so limited.

"Affixed" as used with respect to a cable cover on a floor means that the cover is secured to that floor. Non-limiting illustrative examples of such affixing include: welds; adhesive such as superglue and the like; bolts; and screws; in the usual and ordinary sense of those terms. Particularly preferred embodiments are bolts and screws but the invention is not so limited.

"Concrete" and "slab floor" have their usual and ordinary meanings in the arts of engineering and building design. The term "standard bolt" as used with respect to attaching a cable cover to a floor means a bolt having typical specification for securing building components to a floor of that type.

"Disposed" with respect to a feature on a cable cover means that the feature is placed in an indicated manner, location and or orientation.

"Parallel" has its usual and ordinary meaning in geometry and engineering.

"Americans with Disabilities Act of 1990" means 42 U.S.C. § 12101 and its subsequent amendments, including but not limited to the provisions under ADA Title III for reasonable accommodation. Non-limiting examples of portions that are relevant here include the Americans with Disabilities Act Accessibility Guidelines (ADAAG) in the Code of Federal regulations at 28 C.F.R. Part 36, Appendix A. Reference herein to requirements for floor and ground surfaces under that act mean such surfaces as the Act defines them.

"Asymmetric" as used with respect to three parallel rails assumes that they are coplanar and means that the middle rail is substantially nearer to one of the remaining rails than to the other.

"Path", as used with respect to cables in cable covers on a floor, means the course of the those cable covers. "Bent", as used with respect to a path means that it is not strictly linear, for instance it may include a bend characterized by an angle of 15°, 30°, 45°, 60°, 75° or 90°, or may be characterized by some other angle. In particular embodiments the cable cover may be "mitered" to accommodate such an angle, where the term mitered has its usual and ordinary meaning.

"Channel" as used with respect to a cable cover, means the space occupied by one or more cables. A "rectangular" channel is one having a cross-section bounded on four sides, such as above and below by the central zone and floor respectively, and on either side by separate rails. A "triangular" channel is one having a cross-section bounded on three sides, such as by a rail on one side, a diagonal rightward or leftward zone on the other, and the floor.

"Hardware for joining" the invention cable cover to a raceway or other cable cover, particularly at a floor and a wall or pillar, means hardware to mate them in a way that allows suitable unbroken protection of a cable that passes through both of them. Examples of suitable hardware include metal elbow units, junction boxes, flexible sleeves, and the like.

The term "caution marking" means a marking such as by paint, ink, tape, stamped metal, or other means to alert persons to hazards. Examples for use with the invention include icons and text, for instance "DO NOT CUT OR DRILL" to prevent electrocution or operational interruptions. Other examples include brightly colored stripes, e.g., if equipment on site might scrape the floor powerfully enough to shear the bolts and cables of a cable cover.

Manufacture and Use of the Invention

The present invention provides a bottomless cable cover that has a variety of benefits including: large capacity; low profile; robust strength; rapid heat dissipation; easy and inexpensive reconfigurations of site cable networks and their harnesses; and effective radiofrequency shielding. Welds are particularly preferable for fabrication of the cable cover in order to impart strength, but any means to attach the parts to one another securely according to the invention design is contemplated.

The invention has been found to work well for extended periods under heavy traffic. In particular it has been tested as a substitute for drop-down cables at point-of-sale counters in retail environments. There cable cover portions constructed from ca. ⅛-inch aluminum sheeting with five support rails are sufficient to bear up under sustained pedestrian and cart traffic for high-volume covers that are even more than a foot wide. Yet the maximum height of its trapezoidal profile need be only three-quarters to one inch high. Indeed, the maximum height can be as low as one-half inch, thereby facilitating ground and floor surface accommodations under the Americans with Disabilities Act of 1990.

The maximum rated capacity of raceways and the like is stipulated by electrical codes, and is typically use of around 55% of the cross-section of raceway channels. For the present invention the capacity can be extended readily by employing wider cable covers, side-by-side cable covers, or pyramid-style stacked cable covers, all without introducing unacceptably steep profiles.

The bottomless format facilitates rapid reconfiguration of the protected wires. That is further aided because floor-only cable covers avoid rewiring at poorly accessible vertically displaced portions of buildings.

The use of asymmetrically placed support rails minimizes the contribution of harmonic vibrations to noise levels and further allows placement of cable bundles in a manner convenient to the size of the bundle. In preferred embodiments the asymmetric rail has a separation ratio of at least 3:2—or no more than 2:3—for the distances from its nearest neighboring rail on each side. If desired, vibration-damping material can also be placed at a cable cover's contact points with a floor to minimize noise when it is stepped on or rolled over.

Certain ranges of aspect ratios and dimensions have been found to be useful for ensuring a smooth flow of traffic over the installed cable cover. In particular a length:width aspect ratio of no more than 4.5:1 for the central zone of the traffic portion of the cable cover imparts rectangular speed-table-like characteristics as opposed to shorter harder speed bump quality. Angled entry and exit zones (i.e., leftward and rightward zones, not necessarily respectively) that are each at least 30% as wide as the central zone likewise ensure smooth passage. And the support rail length:height aspect ratio of at least 57:1 is consistent with these.

The specifications for the useful embodiments and operation of invention are flexible enough that several aspects are at least in part a matter of aesthetics. These aspects are most apparent when the cable cover is viewed from its ends however they are also evident in the pleasing appearance of a shallow metal mesa as viewed from the sides and top of the cable cover. Features subject to aesthetic selection include: the composition from which the cable cover is constituted; the transparency and or color of that composition; the angles of the trapezoid's sides; the height and width of the cable cover; the placement of the asymmetry-introducing middle support rail; the locations of bolt holes; the smoothness or texture of the surface; and caution markings where present.

FIGURES

Referring now to the Figures, the features of the floor cable cover of the present invention may be observed in a particular nonlimiting illustrative embodiment that is depicted there.

Figure 1:
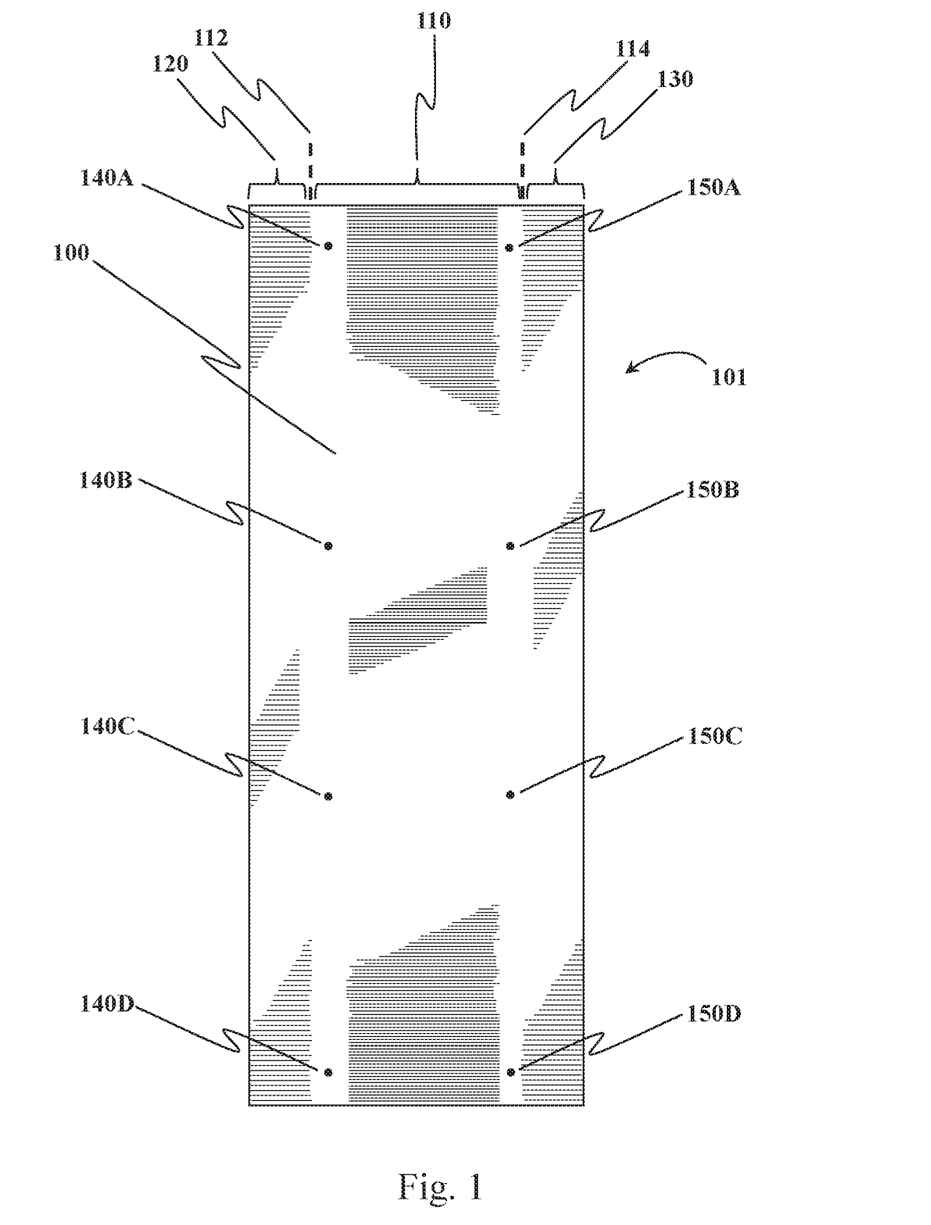
FIG. 1 is a top plan view thereof.

FIG. 1 is a top plan view depicting the upper surface 100 of the traffic portion of the invention heavy-duty cable cover 101, including its central zone 110, leftward zone 120, and rightward zone 130; the zones are bounded by bends 112 and 114 in the sheet material, respectively corresponding to the left boundary and right boundary of the central zone. The orifices are 140A-D and 150A-D, and optionally are bore holes for bolts for attachment to concrete floors. The orifices are shown here as being four in each line, however fewer or more orifices may be employed, and their arrangement may be more decorative, particularly where more of them are provided and they have patterns such a zig-zag, grid or sigmoidal feature. In some embodiments few or none of the orifices are actually occupied by a bolt; in some embodiments the orifices not occupied by a bolt are occupied by a clear or color coordinated plug of material. In the embodiment shown the orifice centers closest to the end are 1.5 inches from the end, and the centers for orifices in series are separated by the following distances: 12 inches for 140A and 140B, 10 inches for 140B and 140C, and 11 inches for 140C and 140D. This reflects asymmetric placement also. On the other side the separation of orifices 150A-D from one another mirrors those distances. From FIG. 1 it can also be appreciated that the overall length:width aspect ratio for the central zone is no more than 4.5:1.

Figure 2:
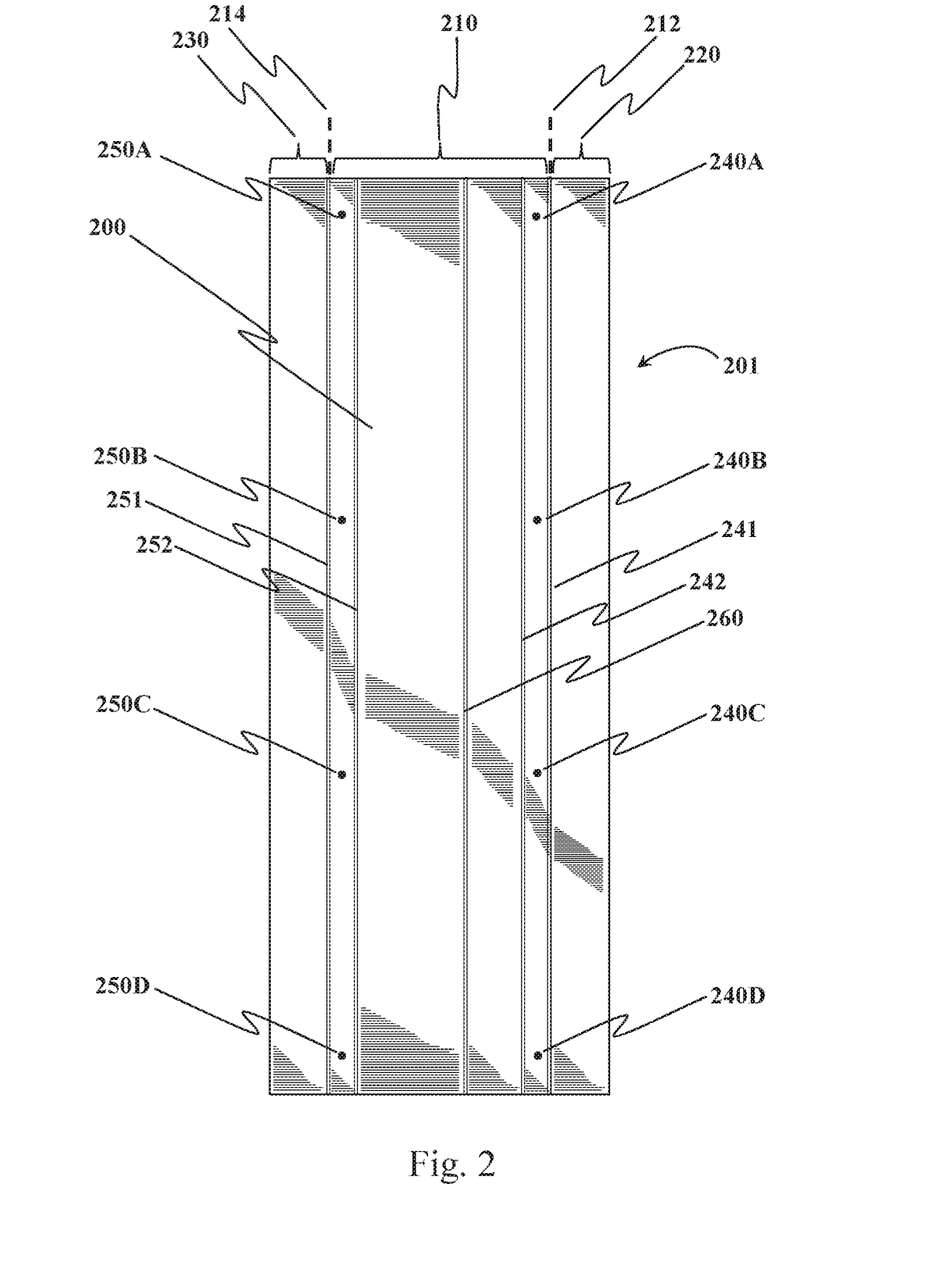
FIG. 2 is a bottom plan view thereof.

FIG. 2 is a top plan view depicting the lower surface 200 of the traffic portion of the invention heavy-duty cable cover 201, including its central zone 210, leftward zone 220, and rightward zone 230; bends 212 and 214 forming zone boundaries in the sheet material, and orifices 240A-D and 250A-D. Parallel support rails 241 and 242 bracket a series of orifices 240A-D, defining a channel from which cables may be excluded in order to protect them from sharp threads of floor attachment means such as screws or bolts. Parallel support rails 251 and 252 on the other side likewise bracket a series of orifices 250A-D. Middle rail 260 is asymmetrically disposed in the middle and parallel to the other rails.

Figure 3:
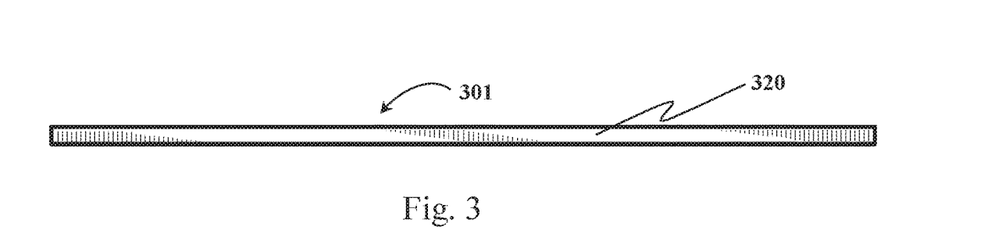
FIG. 3 is a left side elevational view thereof, the right side being a mirror image thereof.

FIG. 3 depicts the invention heavy-duty cable cover 301 from the left side, which however is a mirror image of the right side. Only the upper surface of leftward zone 320 is visible; it slopes downward with its near edge at the bottom. The low profile and the large aspect ratio of length to height are evident. Here the aspect ratio of a minimum of 57:1 for length:height can be appreciated visibly.

Figure 4:
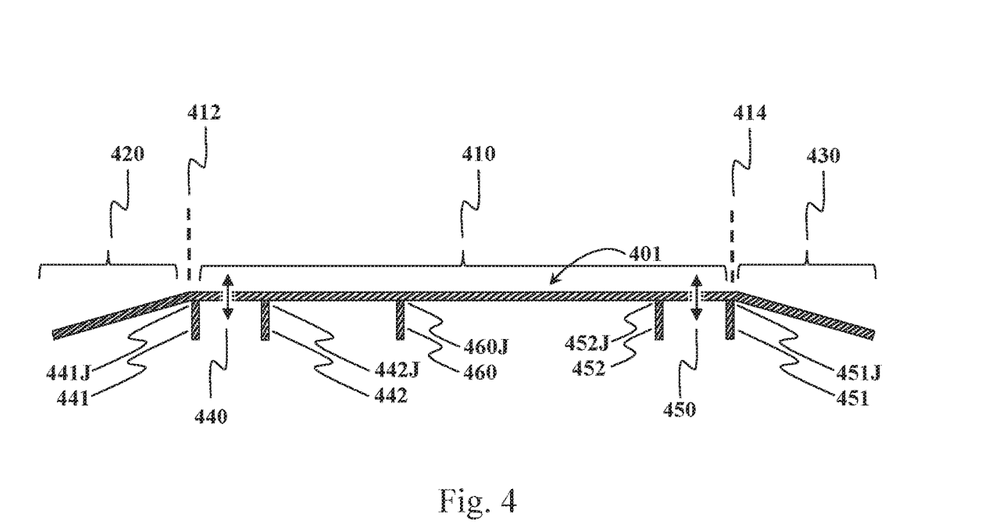
FIG. 4 is a front side elevational view thereof, the back side being a mirror image thereof. Except for the round orifices, transverse cross sections of the cable cover are constant along its length and share this same appearance.

FIG. 4 is an end-on view of the invention heavy-duty cable cover 401, and is shown at ca. three times the scale of FIGS. 1, 2 and 3. The opposite end is a mirror image, and transverse cross-sectional views taken anywhere along the length would be the same, depending of course on which side they were viewed from. FIG. 4 is designated as showing the front side because the leftward zone 420 is to the left and the rightward zone 430 is to the right of central zone 410. Here the zone boundaries can be seen to be the bends at 412 and 414. Material-wise measurements of the width of the leftward and rightward zones are taken along the upper surface of the slopes, not horizontally; furthermore each of the leftward zone and rightward zone is at least 30 percent as wide as the central zone when the measurement is made in a material-wise manner. On the leftward side parallel rails 441 and 442 bracket a strip in which a series of orifices 440 are placed periodically for use with attachment means as designated by the arrow; on the rightward side parallel rails 451 and 452 bracket another series of orifices 450. The asymmetrically place middle rail 460 is the point from which the leftward side is differentiated from the rightward side. Joints 441J, 442J, 451J, 452J and 460J are at the upper edge of corresponding respective rails 441, 442, 451, 452 and 460, and are secured to the lower surface of the traffic portion such as monolithically by coextrusion, or by welds or adhesive. In this particular embodiment the maximum height is 0.75 inches, and the thickness of the sheet material from which the traffic portion and rails are made is ca. ⅛ inch. Sheet or plate aluminum in particular is useful but the invention is not so limited. The distances between neighboring rails are 1.00 inches between 441 and 442, 2.00 inches between 442 and 460, 4.00 inches between 460 and 452, and 1.00 inches between 452 and 451. The placement of the middle rail 460 is discretionary with respect to the symmetry, however the 442-to-460 separation distance should be no more than two-thirds of the 460-to-452 separation distance.

Figure 5:
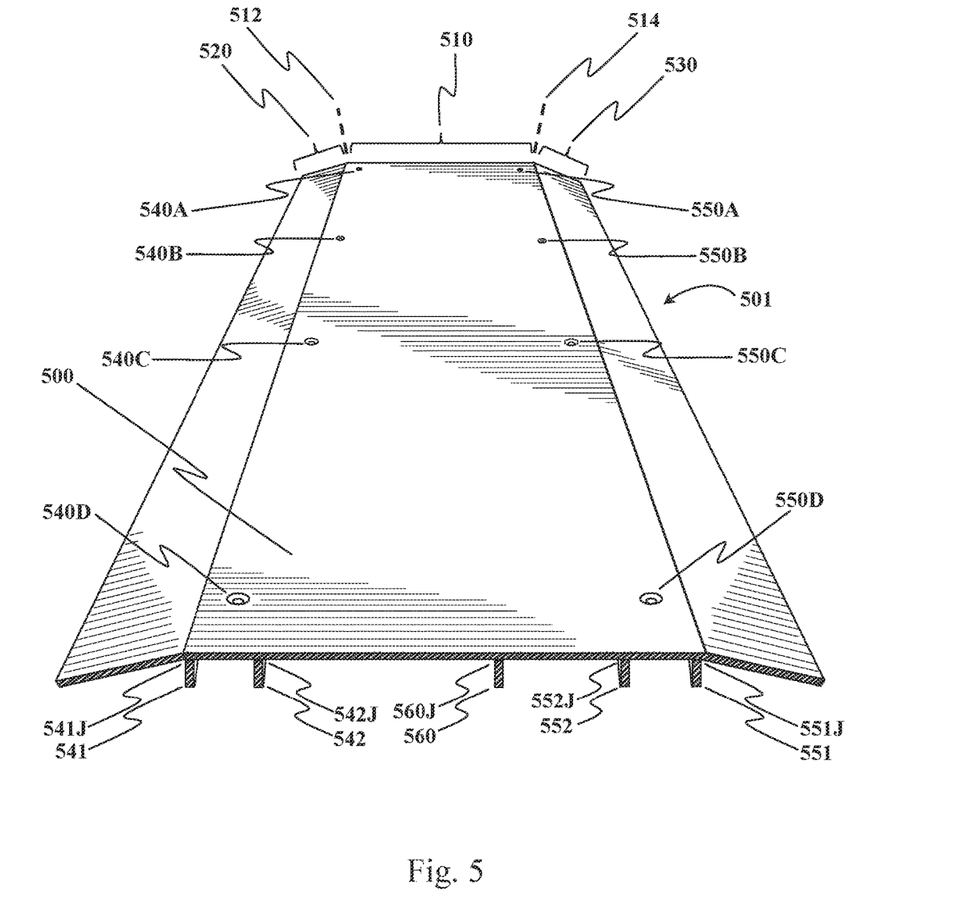
FIG. 5 is a back perspective view of the top thereof.

FIG. 5 depicts an overhead perspective view from the back end of the cable cover 501 so that the essential features may be appreciated more fully. In this case the cable cover is constituted by a metal composition. This view depicts the upper surface 500 of the traffic portion of the invention heavy-duty cable cover 501, including its central zone 510, leftward zone 520, and rightward zone 530; the zones are bounded by bends 512 and 514 in the sheet material, respectively corresponding to the left boundary and right boundary of the central zone. The orifices are 540A-D and 550A-D, and optionally are bore holes for bolts for attachment to concrete floors. On the leftward side parallel rails 541 and 542 bracket the series of orifices 540 A-D; on the rightward side parallel rails 551 and 552 bracket the series of orifices 550A-D. The middle rail 560 is asymmetrically placed. Joints 541J, 542J, 551J, 552J and 560J are at the upper edge of corresponding respective rails 541, 542, 551, 552 and 560, and are affixed to the lower surface of the traffic portion.

Figure 6:
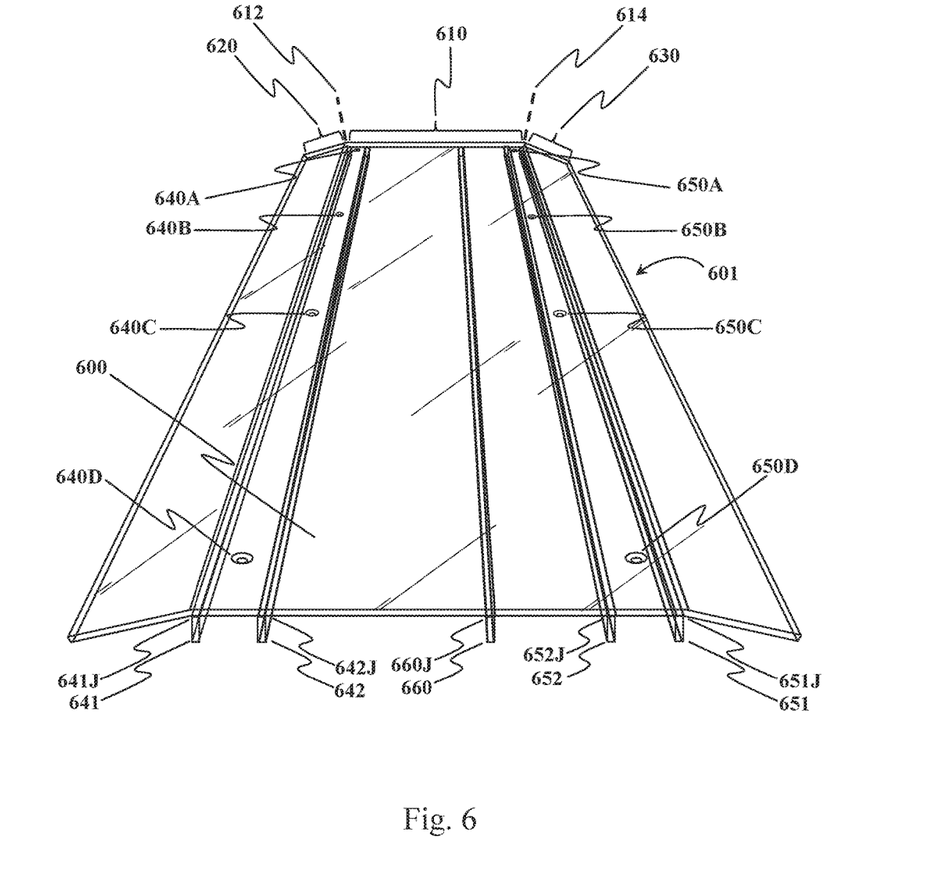
FIG. 6 is a back perspective view of the top thereof wherein the material is transparent.

FIG. 6 depicts the same overhead perspective view from the back end as shown in FIG. 5, however here the various features of the cable cover are composed of a transparent material in order to allow for more decorative use. This view depicts the upper surface 600 of the traffic portion of the invention heavy-duty cable cover 601, including its central zone 610, leftward zone 620, and rightward zone 630; the zones are bounded by bends 612 and 614 in the sheet material, respectively corresponding to the left boundary and right boundary of the central zone. The orifices are 640A-D and 650A-D, and optionally are bore holes for bolts for attachment to concrete floors. On the leftward side parallel rails 641 and 642 bracket the series of orifices 640 A-D; on the rightward side parallel rails 651 and 652 bracket the series of orifices 650 A-D. The middle rail 660 is asymmetrically placed. Joints 641J, 642J, 651J, 652J and 660J are at the upper edge of corresponding respective rails 641, 642, 651, 652 and 660, and are affixed to the lower surface of the traffic portion.

Figure 7:
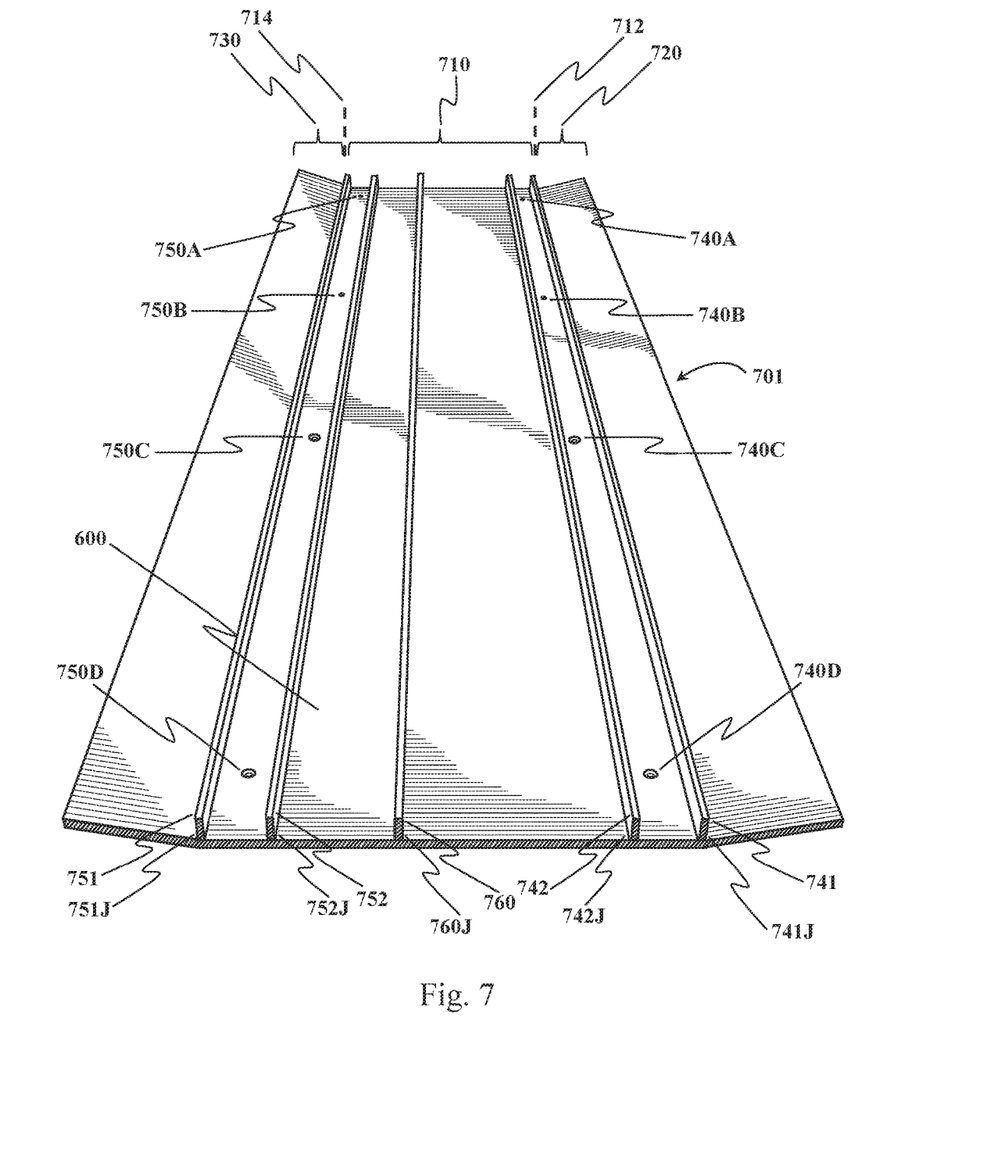
FIG. 7 is a back perspective view of the bottom thereof.

FIG. 7 depicts an overhead perspective view of the underside as seen from the back end. This view depicts the lower surface 700 of the traffic portion of the invention heavy-duty cable cover 701, including its central zone 710, leftward zone 720, and rightward zone 730; the zones are bounded by bends 712 and 714 in the sheet material, respectively corresponding to the left boundary and right boundary of the central zone. The orifices are 740A-D and 750A-D, and optionally are bore holes for bolts for attachment to concrete floors. On the leftward side parallel rails 741 and 742 bracket the series of orifices 740 A-D; on the rightward side parallel rails 751 and 752 bracket the series of orifices 750 A-D. The middle rail 760 is asymmetrically placed. Joints 741J, 742J, 751J, 752J and 760J are at the upper edge of corresponding respective rails 741, 742, 751, 752 and 760, and are affixed to the lower surface of the traffic portion.

Particular preferred embodiments of the invention have been disclosed in detail for illustrative purposes. However persons of ordinary skill in the art will recognize that variations, modifications and permutations of the disclosed apparatus, including many rearrangements of the design, lie within the scope of the present invention. These alternate embodiments are also contemplated as part of the invention.

I claim:

1. A heavy-duty cable cover to power and communication cables located on floors, comprising:
   a) a traffic portion formed from a single sheet of sheet material having uniform thickness, wherein the traffic portion has a longitudinal axis and a latitudinal axis that define its length and width respectively, and wherein the traffic portion comprises:
      i) a central zone that extends along the entire length of the traffic portion and is characterized in that:
         A) when the cable cover is in a position to use on a floor the central zone is horizontal and flat;
         B) the central zone is bounded by a leftward boundary and a rightward boundary of the central zone;
         C) the central zone comprises a first series of orifices that is near to but to the right of the leftward boundary of the central zone;
         D) the central zone comprises a second series of orifices that is near to but to the left of the rightward boundary of the central zone; and
         E) the central zone has a length:width aspect ratio of no more than 4.5:1;
      ii) a leftward zone that is adjacent to the central zone's leftward boundary and is characterized in that:
         A) the leftward zone has a material-wise width that is at least 30 percent as large as the width of the central zone;
         B) when the cable cover is oriented as to use on a floor the leftward zone is angled downward from the leftward boundary by the central zone; and
         C) the leftward zone has a right boundary that is defined by a first bend in the sheet material of the traffic portion;
      iii) a rightward zone that is adjacent to the central zone's rightward boundary and is characterized in that:
         A) the rightward zone has a material-wise width that is at least 30 percent as large as the width of the horizontal portion;
         B) when the cable cover is oriented as to use on the floor the rightward zone is angled downward from the rightward boundary by the central zone; and
         C) the rightward zone has a left boundary that is defined by a second bend in the sheet material of the traffic portion; and
   b) a plurality of opposite support portions formed from a sheet material and, characterized in that:
      i) when the cable cover is oriented to use on the floor, each of said opposite support portions is a rail that runs in the direction of the longitudinal axis of the traffic portion;
      ii) each of said rails has a length:height aspect ratio that is at least 57:1;
      iii) each of said rails is affixed to the traffic portion at its underside and the cable cover comprises five such rails disposed in parallel:

A) a first rail of said rails is disposed parallel to and leftward of the first series of orifices;
B) a second rail of said rails is disposed parallel to and rightward of the first series of orifices;
C) a third rail of said rails is disposed parallel to and leftward of the second series of orifices;
D) a fourth rail of said rails is disposed parallel to and rightward of the second series of orifices; and
E) a fifth rail of said rails is disposed parallel to and asymmetrically between the second and third rails, such that the distance between the second and fifth rails when compared to the distance between the third and fifth rails is represented by a ratio that is greater than 3:2 or less than 2:3.

2. The cable cover of claim 1 wherein the traffic portion and each of said rails is formed from a material selected from the group consisting of aluminum, brass, steel, polycarbonates, polyacrylates, polyesters, ceramics, rubbers, and polymer composites.

3. The cable cover of claim 1 wherein each of said rails is affixed to the traffic portion by a means selected from the group consisting of: welds; bolts; and adhesives.

4. The cable cover of claim 1 wherein the thickness of the traffic portion and each of said rails is at least one-eighth inch.

5. The cable cover of claim 1 wherein the orifices in said first and second series of orifices are characterized by respective diameters sufficiently wide to permit passage of a standard bolt to attach the cable cover to a concrete slab.

6. The cable cover of claim 1 wherein, when it is in position to use on the floor, the sheet material from which the traffic portion is formed has leftmost and rightmost edges that are in contact with the floor.

7. The cable cover of claim 1 wherein the sheet material from which the traffic portion is formed has at least one beveled edge.

8. The cable cover of claim 1 wherein the sheet material from which the traffic portion is formed has at least one rounded edge.

9. The cable cover of claim 1 wherein it is one of a series of identical cable covers having respective lengthwise orientations that define a path on the floor.

10. The cable cover of claim 1 wherein it is affixed to the floor, and wherein at least one power cable or communications cable extends through a rectangular channel defined by the central zone, the floor, and two of said rails.

11. The cable cover of claim 1 wherein it is affixed to the floor and at least one power cable or communications cable extends through a triangular channel defined by the leftward or rightward zone, the floor, and one of said rails.

12. The cable cover of claim 1 wherein the single sheet of material from which the traffic portion is formed has a smooth upper surface.

13. The cable cover of claim 1 wherein the single sheet of material from which the traffic portion is formed has a non-smooth upper surface selected from the group consisting of: ribbed surface; grainy surface; etched surface, checkerboard surface, waffle surface, and cobbled surface.

14. The cable cover of claim 1 wherein a vibration-damping material is placed on lowermost edges of a part selected from the group consisting of the following: the first rail, the second rail, the third rail, the fourth rail, the fifth rail, the leftward zone, and the rightward zone.

15. The cable cover of claim 1 wherein each of said rails is formed from a different type of material than the traffic portion is.

16. The cable cover of claim 1, further comprising bolts to attach the cable cover to the floor.

17. The cable cover of claim 1, further comprising hardware to join it in horizontal format to an upward-extending or downward-extending vertically mounted raceway or other cable cover.

18. The cable cover of claim 1, wherein the cable cover has at least one end that is mitered to permit formation of a bent path on the floor.

19. The cable cover of claim 1, wherein the traffic portion bears caution markings on an upper surface.

* * * * *